United States Patent
Je et al.

(10) Patent No.: US 9,061,570 B1
(45) Date of Patent: Jun. 23, 2015

(54) SLIDING DOOR FOR VEHICLE

(71) Applicant: Kia Motors Corporation, Seoul (KR)

(72) Inventors: Myoung Kwon Je, Seoul (KR); Chi Young Min, Bucheon-si (KR); Jae Hong Choi, Gwangmyeong-si (KR)

(73) Assignee: KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/297,262

(22) Filed: Jun. 5, 2014

(30) Foreign Application Priority Data

Dec. 24, 2013 (KR) .................. 10-2013-0162930

(51) Int. Cl.
*B60J 5/06* (2006.01)

(52) U.S. Cl.
CPC .......................... *B60J 5/06* (2013.01)

(58) Field of Classification Search
CPC .... E05F 15/646; E05Y 2900/531; B60J 5/00; B65H 2220/11; A47B 2210/0045; B60P 3/08; B61D 3/18; B65D 2585/6867; B60L 2200/26; B60P 3/07
USPC ............................................. 296/155; 49/360
See application file for complete search history.

(56) References Cited

U.S. PATENT DOCUMENTS

| | | | | |
|---|---|---|---|---|
| 4,640,050 A | * | 2/1987 | Yamagishi et al. | 49/280 |
| 4,887,390 A | * | 12/1989 | Boyko et al. | 49/214 |
| 5,737,875 A | * | 4/1998 | Dowling et al. | 49/360 |
| 5,737,876 A | * | 4/1998 | Dowling | 49/360 |
| 5,809,696 A | * | 9/1998 | Watanabe | 49/360 |
| 5,829,198 A | * | 11/1998 | Watanabe | 49/280 |
| 5,832,669 A | * | 11/1998 | Mizuki et al. | 49/360 |
| 5,833,301 A | * | 11/1998 | Watanabe et al. | 296/155 |
| 6,108,976 A | * | 8/2000 | Kato et al. | 49/360 |
| 6,155,630 A | * | 12/2000 | Fukumoto et al. | 296/155 |
| 8,857,890 B2 | * | 10/2014 | Okada et al. | 296/146.4 |
| 2002/0043818 A1 | * | 4/2002 | Fukumoto et al. | 296/155 |
| 2004/0036355 A1 | * | 2/2004 | Choi | 307/10.1 |
| 2005/0253414 A1 | * | 11/2005 | Yokomori | 296/146.4 |
| 2006/0055202 A1 | * | 3/2006 | Osada et al. | 296/146.1 |
| 2006/0068958 A1 | * | 3/2006 | Kita et al. | 474/135 |
| 2006/0112643 A1 | * | 6/2006 | Yokomori et al. | 49/360 |
| 2006/0113821 A1 | * | 6/2006 | Yokomori et al. | 296/155 |
| 2006/0143986 A1 | * | 7/2006 | Yokomori et al. | 49/360 |
| 2006/0181109 A1 | * | 8/2006 | Mitsui et al. | 296/155 |

(Continued)

FOREIGN PATENT DOCUMENTS

| | | |
|---|---|---|
| JP | 2001-323724 A | 11/2001 |
| JP | 2010-185270 A | 8/2010 |

(Continued)

*Primary Examiner* — Kiran B Patel
(74) *Attorney, Agent, or Firm* — Morgan, Lewis & Bockius LLP

(57) ABSTRACT

A sliding door for a vehicle includes a rail unit may include a center rail provided on an outer surface of a rear side inner panel in a longitudinal direction of the vehicle body, and an auxiliary rail provided along a lower end of the center rail, a drive unit that has front and rear pulleys respectively provided at front and rear sides of an inner surface of the rear side inner panel, and a wire wound around the front and rear pulleys to be moved by a driving power of a driving motor, a roller bracket that is provided at the center rail to be slidably moved, and is connected to both ends of the wire to be moved along the center rail by the driving power, and a door whose one side is fixed to the roller bracket to be slid with respect to the vehicle body.

5 Claims, 5 Drawing Sheets

(56) References Cited

U.S. PATENT DOCUMENTS

| | | | |
|---|---|---|---|
| 2007/0163857 A1* | 7/2007 | Yokomori | 192/215 |
| 2009/0133333 A1* | 5/2009 | Yokomori et al. | 49/360 |
| 2010/0006407 A1* | 1/2010 | Masuko | 200/61.44 |
| 2010/0170159 A1* | 7/2010 | Takeuchi et al. | 49/360 |
| 2010/0251619 A1* | 10/2010 | Ishida et al. | 49/358 |
| 2013/0160581 A1* | 6/2013 | Okada et al. | 74/89.2 |
| 2013/0333290 A1* | 12/2013 | Ishigaki et al. | 49/349 |
| 2014/0020299 A1* | 1/2014 | Takahashi et al. | 49/173 |
| 2014/0117706 A1* | 5/2014 | Fortin | 296/146.6 |
| 2014/0173989 A1* | 6/2014 | Choi | 49/350 |
| 2014/0259938 A1* | 9/2014 | Choi et al. | 49/226 |

FOREIGN PATENT DOCUMENTS

| | | |
|---|---|---|
| JP | 4789588 B2 | 7/2011 |
| JP | 2013-181330 A | 9/2013 |

* cited by examiner

SLIDING DOOR FOR VEHICLE

CROSS-REFERENCE TO RELATED APPLICATION

The present application claims priority of Korean Patent Application Number 10-2013-0162930 filed on Dec. 24, 2013, the entire contents of which application are incorporated herein for all purposes by this reference.

BACKGROUND OF INVENTION

1. Field of Invention

The present invention relates to a sliding door for a vehicle, and more particularly, to a sliding door for a vehicle which can improve an external appearance of a trim inside a vehicle and can resolve inconvenience of an occupant.

2. Description of Related Art

In general, a sliding door for a vehicle is slidably moved in a longitudinal direction of a vehicle to open and close the vehicle.

Accordingly, a rail is attached to a vehicle body, and a roller bracket is attached to the door so as to be moved along the rail.

A conventional sliding door for a vehicle includes a rail unit including a center rail provided on an outer surface of a rear side inner panel of a vehicle body in a longitudinal direction of the vehicle and an auxiliary rail provided along a lower end of the center rail, a drive unit including front and rear pulleys that are respectively provided at front and rear sides of an inner surface of the rear side inner panel of the vehicle body and a wire wound around the front and rear pulleys to be moved by a driving power of a driving motor, a roller bracket that is provided at the center rail to be slidably moved and is connected to both ends of the wire to be moved along the center rail by the driving power of the driving motor, and a door whose one side is fixed to the roller bracket to be slid with respect to the vehicle body.

However, in the conventional sliding door for a vehicle, the front pulley is positioned at an end of the center rail, and is provided at the front side of the inner surface of the rear side inner panel of the vehicle body. Accordingly, a trim inside the vehicle is formed to protrude, and thus, the trim inside the vehicle may have a bad external appearance. Further, an occupant may feel inconvenience due to the protrusion of the trim.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a sliding door for a vehicle having advantages of improving an external appearance of a trim inside a vehicle by providing a front pulley at a front side of an inner surface of a rear side inner panel of a vehicle body so as to correspond to one side inside a center rail.

In an aspect of the present invention, a sliding door apparatus for a vehicle may include a rail unit having a center rail provided on an outer surface of a rear side inner panel of a vehicle body in a longitudinal direction of the vehicle body, and an auxiliary rail provided along a lower end of the center rail, a drive unit having front and rear pulleys that are respectively provided at front and rear sides of an inner surface of the rear side inner panel of the vehicle body, and a wire wound around the front and rear pulleys to be moved by a driving power of a driving motor, a roller bracket that is provided at the center rail to be slidably moved, and is connected to both ends of the wire to be moved along the center rail by the driving power of the driving motor, and a door whose one side is fixed to the roller bracket to be slid with respect to the vehicle body, wherein the center rail may include a curved line part of a front end part, and a straight line part that is formed along a rear surface of the vehicle body, and wherein the both ends of the wire are respectively connected to upper and lower sides of a rear of the roller bracket on a vertical line, and the front pulley is provided at a front side of the inner surface of the rear side inner panel of the vehicle body so as to correspond to one side inside the curved line part of the center rail.

A first end of the wire connected to the roller bracket via the rear pulley is hinge-connected to the upper side of the rear of the roller bracket on the vertical line, and a second end of the wire connected to the roller bracket via the front pulley is hinge-connected to the lower side of the rear of the roller bracket on the vertical line.

The wire connected to the roller bracket via the rear pulley is moved along the center rail.

The wire connected to the roller bracket via the front pulley is moved along the auxiliary rail.

The front pulley is attached to the inner surface of the rear side inner panel through a pulley bracket, and a part thereof protrudes outward from the rear side inner panel through a penetrating hole formed in the rear side inner panel to correspond to a lower side of the center rail.

According to an exemplary embodiment of the present invention, by providing the front pulley at the front side of the inner surface of the rear side inner panel of the vehicle body so as to correspond to one side inside the center rail, it is possible to improve an external appearance of a trim inside a vehicle and to resolve inconvenience of an occupant.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
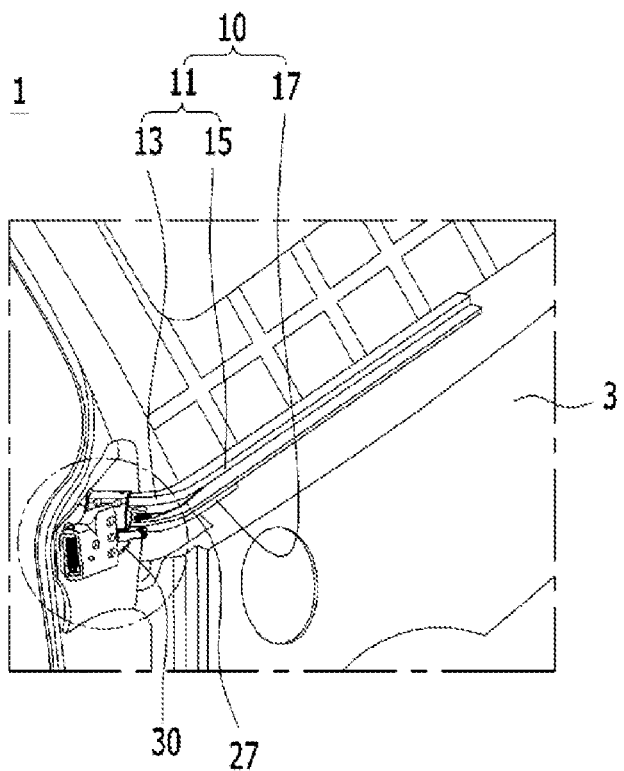
FIGS. 1A and B are outer perspective views of a sliding door for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTIONS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

In the drawings, sizes and thicknesses of components are arbitrarily illustrated for the convenience in description, and, thus, the present invention is not necessarily limited to the drawings. The thicknesses thereof are thickly illustrated to clarify various portions and regions.

Further, unrelated parts will be omitted to clearly describe the exemplary embodiment of the present invention.

Figure 1B:
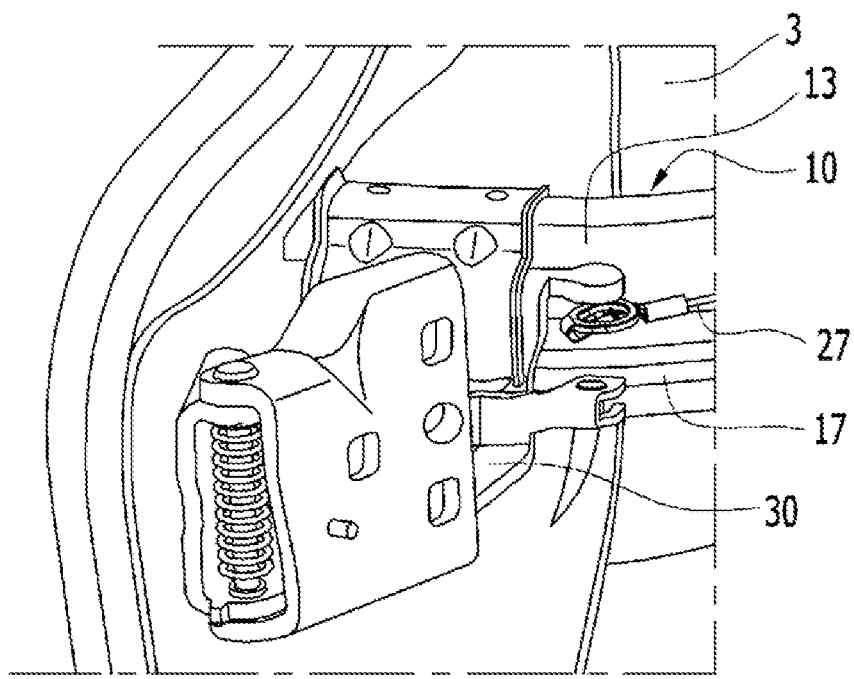
Figure 2A:
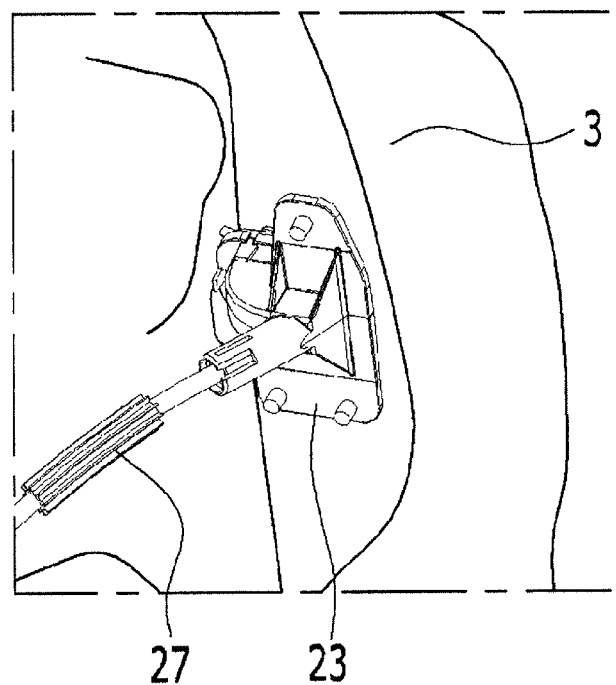
FIGS. 2A and B are inner front views of the sliding door for a vehicle according to the exemplary embodiment of the present invention.
Figure 2B:
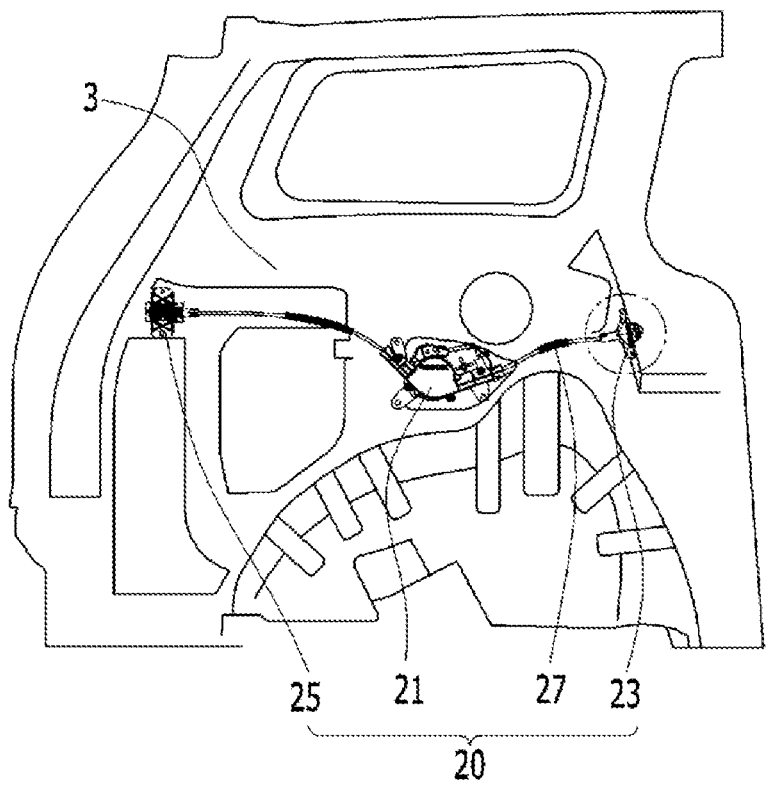
Figure 3:
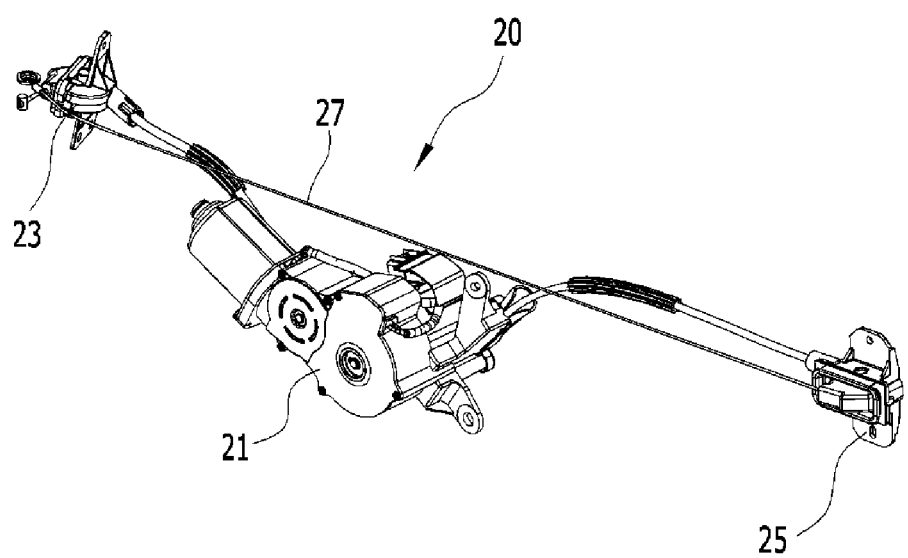
FIG. 3 is a perspective view of a drive unit applied to the sliding door for a vehicle according to the exemplary embodiment of the present invention.

FIGS. 1A and 1B are outer perspective views of a sliding door for a vehicle according to an exemplary embodiment of the present invention, FIGS. 2A and 2B are inner front views of the sliding door for a vehicle according to the exemplary embodiment of the present invention, and FIG. 3 is a perspective view of a drive unit applied to the sliding door for a vehicle according to the exemplary embodiment of the present invention.

Referring to FIGS. 1A to 3, a sliding door 1 for a vehicle according to an exemplary embodiment of the present invention has a structure with which it is possible to improve an external appearance of a trim inside a vehicle and to resolve inconvenience of an occupant.

To achieve this, the sliding door 1 for a vehicle according to the exemplary embodiment of the present invention includes a rail unit 10, a drive unit 20, a roller bracket 30, and a door.

The rail unit 10 includes a center rail 11, and an auxiliary rail 17.

The center rail 11 is provided on an outer surface of a rear side inner panel 3 of a vehicle body in a longitudinal direction of the vehicle.

Here, the center rail 11 includes a curved line part 13, and a straight line part 15.

The curved line part 13 is a front end of the center rail 11, and the straight line part 15 is integrally formed with the curved line part 13 along a rear surface of the vehicle body.

The auxiliary rail 17 is provided along a lower end of the center rail 11, and the auxiliary rail 17 has a length shorter than a length of the center rail 11.

The drive unit 20 includes a driving motor 21, a front pulley 23, a rear pulley 25, and a wire 27.

The driving motor 21 is provided at a center of an inner surface of the rear side inner panel 3 of the vehicle body.

The front pulley 23 is provided at a front side of the inner surface of the rear side inner panel 3 of the vehicle body, and the rear pulley 25 is provided at a rear side of the inner surface of the rear side inner panel 3 of the vehicle body.

The wire 27 is wound around the front pulley 23 and the rear pulley 25 to be moved by a driving power of the driving motor 21.

The roller bracket 30 is provided at the center rail 11 to be slidably moved, and is connected to both ends of the wire 27 to be moved along the center rail 11 by the driving power of the driving motor 21.

The door whose one side is fixed to the roller bracket 30 is slid with the respect to the vehicle body.

Referring back to FIGS. 1A, 1B, 2A and 2B, one end of the wire 27 connected to the roller bracket 30 via the rear pulley 25 is hinge-connected to an upper side of a rear of the roller bracket 30 on the vertical line.

Simultaneously, the wire 27 connected to the roller bracket 30 via the rear pulley 25 is moved along the center rail 11.

Further, another end of the wire 27 connected to the roller bracket 30 via the front pulley 23 is hinge-connected to a lower side of the rear of the roller bracket 30 on the vertical line.

Simultaneously, the wire 27 connected to the roller bracket 30 via the front pulley 23 is moved along the auxiliary rail 17.

Figure 4:
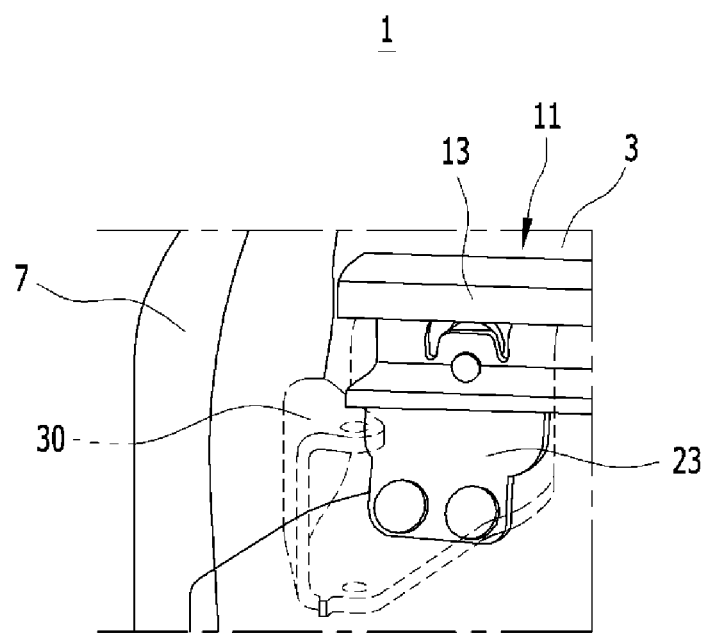
FIG. 4 is a perspective view illustrating position states of a center rail and a front pulley applied to the sliding door for a vehicle according to the exemplary embodiment of the present invention.
Figure 5:
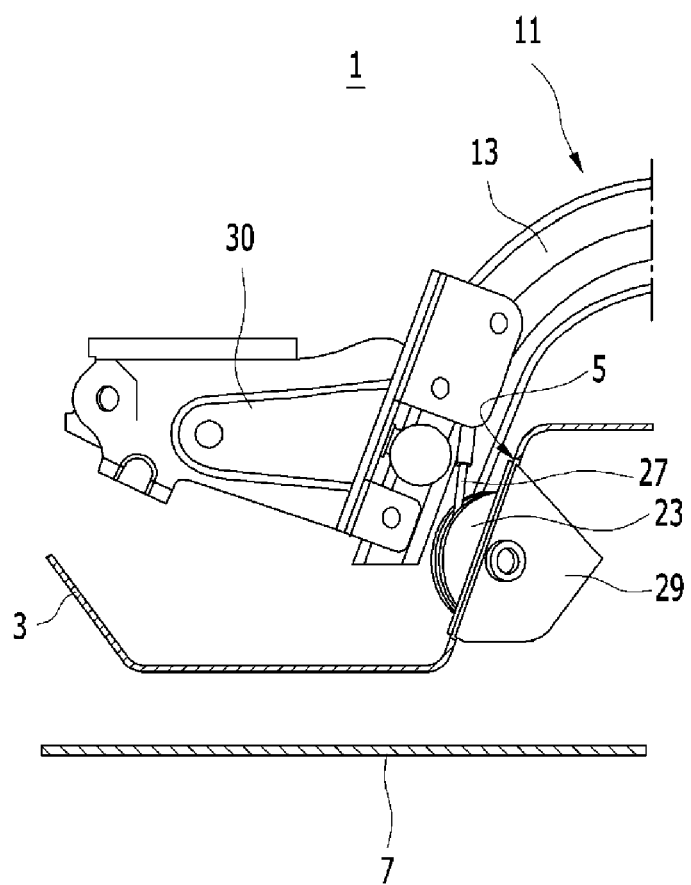
FIG. 5 is a front view of the position states of the center rail and the front pulley applied to the sliding door for a vehicle according to the exemplary embodiment of the present invention.

FIG. 4 is a perspective view illustrating position states of the center rail and the front pulley applied to the sliding door for a vehicle according to the exemplary embodiment of the present invention, and FIG. 5 is a front view illustrating the position states of the center rail and the front pulley applied to the sliding door for a vehicle according to the exemplary embodiment of the present invention.

Referring to FIGS. 4 and 5, in the exemplary embodiment of the present invention, the both ends of the wire 27 are respectively connected to the upper side and the lower side of the rear of the roller bracket 30 on the vertical line, and, thus, the front pulley 23 is provided at the front side of the inner surface of the rear side inner panel 3 of the vehicle body so as to correspond to one side inside the curved line part 13 of the center rail 11.

That is, as illustrated in FIG. 5, the front pulley 23 is attached to the inner surface of the rear side inner panel 3 through a pulley bracket 29, and a part thereof protrudes outward from the rear side inner panel 3 through a penetrating hole 5 formed in the rear side inner panel 3 so that it corresponds to the lower side of the center rail 11.

Accordingly, in the sliding door 1 for a vehicle according to the exemplary embodiment of the present invention, by providing the front pulley 23 at the front side of the inner surface of the rear side inner panel 3 of the vehicle body so as to correspond to the one side inside the curved line part 13 of the center rail 11, it is possible to improve an external appearance of a trim 7 inside the vehicle and to resolve inconvenience of the occupant.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sliding door apparatus for a vehicle comprising:
    a rail unit including:
        a center rail provided on an outer surface of a rear side inner panel of a vehicle body in a longitudinal direction of the vehicle body; and
        an auxiliary rail provided along a lower end of the center rail;
    a drive unit including:
        front and rear pulleys that are respectively provided at front and rear sides of an inner surface of the rear side inner panel of the vehicle body; and
        a wire wound around the front and rear pulleys to be moved by a driving power of a driving motor;
    a roller bracket that is provided at the center rail to be slidably moved, and is connected to both ends of the wire to be moved along the center rail by the driving power of the driving motor; and
    a door whose one side is fixed to the roller bracket to be slid with respect to the vehicle body,
    wherein the center rail includes a curved line part of a front end part, and a straight line part that is formed along a rear surface of the vehicle body; and
    wherein the both ends of the wire are respectively connected to upper and lower sides of a rear of the roller bracket on a vertical line, and the front pulley is provided at a front side of the inner surface of the rear side inner panel of the vehicle body so as to correspond to one side inside the curved line part of the center rail.

2. The sliding door apparatus for the vehicle of claim 1,
    wherein a first end of the wire connected to the roller bracket via the rear pulley is hinge-connected to the upper side of the rear of the roller bracket on the vertical line; and
    wherein a second end of the wire connected to the roller bracket via the front pulley is hinge-connected to the lower side of the rear of the roller bracket on the vertical line.

3. The sliding door apparatus for the vehicle of claim 1, wherein the wire connected to the roller bracket via the rear pulley is moved along the center rail.

4. The sliding door apparatus for the vehicle of claim 1, wherein the wire connected to the roller bracket via the front pulley is moved along the auxiliary rail.

5. The sliding door apparatus for the vehicle of claim 1, wherein the front pulley is attached to the inner surface of the rear side inner panel through a pulley bracket, and a part thereof protrudes outward from the rear side inner panel through a penetrating hole formed in the rear side inner panel to correspond to a lower side of the center rail.

* * * * *